United States Patent
Li et al.

(10) Patent No.: US 11,474,556 B2
(45) Date of Patent: Oct. 18, 2022

(54) OPTICAL COMMUNICATION DRIVE CIRCUIT AND METHOD, OPTICAL COMMUNICATION TRANSMITTER AND SYSTEM, AND VEHICLE

(71) Applicant: BOE TECHNOLOGY GROUP CO., LTD., Beijing (CN)

(72) Inventors: Yanfu Li, Beijing (CN); Liming Xiu, Beijing (CN); Xin Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 205 days.

(21) Appl. No.: 16/769,297

(22) PCT Filed: Mar. 29, 2019

(86) PCT No.: PCT/CN2019/080373
§ 371 (c)(1),
(2) Date: Jun. 3, 2020

(87) PCT Pub. No.: WO2020/198917
PCT Pub. Date: Oct. 8, 2020

(65) Prior Publication Data
US 2021/0232175 A1    Jul. 29, 2021

(51) Int. Cl.
*H04B 10/516* (2013.01)
*G06F 1/10* (2006.01)
*G06F 1/08* (2006.01)

(52) U.S. Cl.
CPC ............... *G06F 1/105* (2013.01); *G06F 1/08* (2013.01); *H04B 10/516* (2013.01)

(58) Field of Classification Search
CPC ......................................................... G06F 1/105
See application file for complete search history.

(56) References Cited

U.S. PATENT DOCUMENTS

| | | | | |
|---|---|---|---|---|
| 4,677,608 A | * | 6/1987 | Forsberg | H04B 10/077 398/189 |
| 7,741,928 B1 | * | 6/2010 | Cousinard | H03C 3/095 331/23 |

(Continued)

FOREIGN PATENT DOCUMENTS

| | | |
|---|---|---|
| CN | 101483482 A | 7/2009 |
| CN | 103828317 A | 5/2014 |

(Continued)

OTHER PUBLICATIONS

International search report of PCT application No. PCT/CN2019/080373 dated Jan. 6, 2020.

(Continued)

*Primary Examiner* — Nathan M Cors
(74) *Attorney, Agent, or Firm* — Fay Sharpe LLP

(57) ABSTRACT

The present disclosure provides an optical communication drive circuit and method, an optical communication transmitter, an optical communication system, and a vehicle. The optical communication drive circuit includes a clock circuit and a modulation circuit. The clock circuit is configured to output a clock signal with an initial frequency signal as an input under control of information to be transmitted. The clock signal includes alternating first and second frequency signals, the first frequency signal and the second frequency signal having different frequencies and being generated based on the initial frequency signal; and the modulation circuit is configured to modulate an optical signal by the clock signal to obtain a modulated optical signal.

16 Claims, 6 Drawing Sheets

(56) References Cited

U.S. PATENT DOCUMENTS

| | | |
|---|---|---|
| 2012/0057882 A1 | 3/2012 | Arahira |
| 2012/0224856 A1* | 9/2012 | Sato .................... H04B 10/516 398/79 |
| 2014/0219663 A1 | 8/2014 | Roberts |
| 2016/0315702 A1 | 10/2016 | Roberts et al. |
| 2018/0241475 A1 | 8/2018 | Lu et al. |

FOREIGN PATENT DOCUMENTS

| | | | |
|---|---|---|---|
| CN | 104022824 A | 9/2014 | |
| CN | 104022924 A | 9/2014 | |
| CN | 105049118 A | 11/2015 | |
| WO | WO2014139818 | * 9/2014 | ........... H04B 10/116 |

OTHER PUBLICATIONS

First office action of Chinese application No. 201980000436.1 dated May 10, 2021.

* cited by examiner

OPTICAL COMMUNICATION DRIVE CIRCUIT AND METHOD, OPTICAL COMMUNICATION TRANSMITTER AND SYSTEM, AND VEHICLE

CROSS-REFERENCE TO RELATED APPLICATION

The present disclosure is a 371 of PCT Application No. PCT/CN2019/080373, filed on Mar. 29, 2019, and titled "OPTICAL COMMUNICATION DRIVING CIRCUIT AND METHOD, OPTICAL COMMUNICATION SENDING END, OPTICAL COMMUNICATION SYSTEM AND VEHICLE," the content of which is incorporated herein by reference.

TECHNICAL FIELD

The present disclosure relates to an optical communication drive circuit and method, an optical communication transmitter and system, and a vehicle.

BACKGROUND

Automobile technologies have developed rapidly over the past few years, and unmanned automobiles even become a hotspot currently. For practice of unmanned driving of automobiles, communication between automobiles needs to be implemented first.

Optical communication is an important way in communications between automobiles, and modulation of an optical signal is critical to the optical communication. The modulation of the optical signal includes converting information to be transmitted into a clock signal, and then modulating the optical signal by the clock signal, such that the content of the information to be transmitted is carried in the optical signal.

SUMMARY

Embodiments of the present disclosure provide an optical communication drive circuit and method, an optical communication transmitter and system, and a vehicle.

At least one embodiment of the present disclosure provides an optical communication drive circuit. The optical communication drive circuit includes: a clock circuit, configured to output a clock signal with an initial frequency signal as an input under control of information to be transmitted, wherein the clock signal includes alternating first and second frequency signals, the first frequency signal and the second frequency signal having different frequencies and being generated based on the initial frequency signal; and a modulation circuit, configured to modulate an optical signal by the clock signal output by the clock circuit to obtain a modulated optical signal.

In one implementation of embodiments of the present disclosure, the clock circuit includes: a control sub-circuit, configured to generate a sequence of control words according to the information to be transmitted, wherein the sequence of control words includes alternating first and second control words; and a processing sub-circuit, configured to obtain the first frequency signal based on a frequency of the initial frequency signal and the first control word in the sequence of control words generated by the control sub-circuit, and obtain the second frequency signal based on the frequency of the initial frequency signal and the second control word in the sequence of control words generated by the control sub-circuit.

In one implementation of embodiments of the present disclosure, the control sub-circuit is configured to sequentially select, based on a corresponding relationship between bits and control words, control words corresponding to respective bits in the information to be transmitted according to an order of the bits in the information to be transmitted, to obtain the sequence of control words.

In one implementation of embodiments of the present disclosure, the control sub-circuit is configured to select the corresponding relationship between the bits and the control words according to a communication mode, wherein the corresponding relationship between the bits and the control words is at least partially different in different communication modes.

In one implementation of embodiments of the present disclosure, the processing sub-circuit includes: a frequency divider configured to generate K signals having uniformly spaced phases according to the initial frequency signal, wherein K is an integer greater than 2; and a frequency synthesizer configured to generate the first frequency signal based on the K signals having uniformly spaced phases generated by the frequency divider and the first control word, and to generate the second frequency signal based on the K signals having uniformly spaced phases and the second control word.

In one implementation of embodiments of the present disclosure, the frequency synthesizer is configured to generate a first periodic signal and a second periodic signal based on the K signals having uniformly spaced phases and the first control word, and further generate the first frequency signal based on the first periodic signal and the second periodic signal; and to generate a third periodic signal and a fourth periodic signal based on the K signals having uniformly spaced phases and the second control word, and further generate the second frequency signal based on the third periodic signal and the fourth periodic signal.

In one implementation of embodiments of the present disclosure, the frequency synthesizer is configured to generate the first periodic signal, the second periodic signal, the third periodic signal and the fourth periodic signal according to a formula as follows: $T_A=I*\Delta$, $T_B=(I+1)*\Delta$, $T_C=J*\Delta$, $T_D=(J+1)*\Delta$, wherein $\Delta$ represents a phase difference between any two adjacent signals of the K signals having uniformly spaced phases, I represents an integer part in the first control word, J represents an integer part in the second control word, $T_A$ represents the first periodic signal, $T_B$ represents the second periodic signal, $T_C$ represents the third periodic signal, and $T_D$ represents the fourth periodic signal.

In one implementation of embodiments of the present disclosure, the frequency synthesizer is configured to generate the first frequency signal and the second frequency signal according to a formula as follows: $T_{TAF1}=(1+r)*T_A+r*T_B$, $T_{TAF2}=(1-s)*T_C+s*T_D$, wherein $T_{TAF1}$ represents a period of the first frequency signal, r represents a decimal part in the first control word, with $0 \le r < 1$, $T_{TAF2}$ represents a period of the second frequency signal, and s represents a decimal part in the second control word, with $0 \le s < 1$.

At least one embodiment of the present disclosure provides an optical communication transmitter. The optical communication transmitter includes a light emitting unit and the optical communication drive circuit as described above, wherein the optical communication drive circuit is configured to modulate an optical signal generated by the light emitting unit, to obtain a modulated optical signal.

At least one embodiment of the present disclosure provides an optical communication system. The system includes a transmitter and a receiver. The transmitter is the optical communication transmitter as described above.

At least one embodiment of the present disclosure provides a vehicle. The vehicle includes the optical communication transmitter as described above.

At least one embodiment of the present disclosure provides an optical communication drive method. The method includes: outputting a clock signal with an initial frequency signal as an input under control of information to be transmitted, wherein the clock signal includes alternating first and second frequency signals, the first frequency signal and the second frequency signal having different frequencies and being generated based on the initial frequency signal; and modulating an optical signal by the clock signal to obtain a modulated optical signal.

In one implementation of embodiments of the present disclosure, outputting the clock signal with the initial frequency signal as the input under the control of the information to be transmitted includes: generating a sequence of control words according to the information to be transmitted, wherein the sequence of control words includes alternating first and second control words; and obtaining the first frequency signal based on a frequency of the initial frequency signal and the first control word, and obtaining the second frequency signal based on the frequency of the initial frequency signal and the second control word.

In one implementation of embodiments of the present disclosure, generating the sequence of control words according to the information to be transmitted includes: sequentially selecting, based on a corresponding relationship between bits and control words, control words corresponding to respective bits in the information to be transmitted according to an order of the bits in the information to be transmitted, to obtain the sequence of control words.

In one implementation of embodiments of the present disclosure, before sequentially selecting, based on the corresponding relationship between the bits and the control words, the control words corresponding to the respective bits in the information to be transmitted according to the order of the bits in the information to be transmitted, generating the sequence of control words according to the information to be transmitted further includes: selecting the corresponding relationship between the bits and the control words according to a communication mode, wherein the corresponding relationship between the bits and the control words is at least partially different in different communication modes.

In one implementation of embodiments of the present disclosure, obtaining the first frequency signal based on the frequency of the initial frequency signal and the first control word, and obtaining the second frequency signal based on the frequency of the initial frequency signal and the second control word include: generating K signals having uniformly spaced phases according to the initial frequency signal, wherein K is an integer greater than 2; and generating the first frequency signal based on the K signals having uniformly spaced phases and the first control word, and generating the second frequency signal based on the K signals having uniformly spaced phases and the second control word.

In one implementation of embodiments of the present disclosure, generating the first frequency signal based on the K signals having uniformly spaced phases and the first control word, and generating the second frequency signal based on the K signals having uniformly spaced phases and the second control word include: generating a first periodic signal and a second periodic signal based on the K signals having uniformly spaced phases and the first control word, and further generating the first frequency signal based on the first periodic signal and the second periodic signal; and generating a third periodic signal and a fourth periodic signal based on the K signals having uniformly spaced phases and the second control word, and further generating the second frequency signal based on the third periodic signal and the fourth periodic signal.

In one implementation of embodiments of the present disclosure, generating the first periodic signal and the second periodic signal based on the K signals having uniformly spaced phases and the first control word, and generating the third periodic signal and the fourth periodic signal based on the K signals having uniformly spaced phases and the second control word include: generating the first periodic signal, the second periodic signal, the third periodic signal and the fourth periodic signal according to a formula as follows: $T_A=I*\Delta$, $T_B=(I+1)*\Delta$, $T_C=J*\Delta$, $T_D=(J+1)*\Delta$, wherein $\Delta$ represents a phase difference between any two adjacent signals of the K signals having uniformly spaced phases, I represents an integer part in the first control word, J represents an integer part in the second control word, $T_A$ represents the first periodic signal, $T_B$ represents the second periodic signal, $T_C$ represents the third periodic signal, and $T_D$ represents the fourth periodic signal.

In one implementation of embodiments of the present disclosure, generating the first frequency signal based on the first periodic signal and the second periodic signal, and generating the second frequency signal based on the third periodic signal and the fourth periodic signal includes: generating the first frequency signal and the second frequency signal according to a formula as follows: $T_{TAF1}=(1-r)*T_A+r*T_B$, $T_{TAF2}=(1-s)*T_C+s*T_D$, wherein $T_{TAF1}$ represents a period of the first frequency signal, r represents a decimal part in the first control word, with $0 \leq r < 1$, $T_{TAF2}$ represents a period of the second frequency signal, and s represents a decimal part in the second control word, with $0 \leq s < 1$.

DETAILED DESCRIPTION

The present disclosure will be described in further detail with reference to the accompanying drawings, to present the principles and advantages of the present disclosure more clearly.

Binary frequency-shift keying (FSK) technology can implement the process of converting information to be transmitted into a clock signal, and the generated clock signal has better anti-noise and anti-fading capabilities. In the FSK technology, the bits 0 and 1 of the information to be transmitted are denoted by waveforms of corresponding periods in two frequency signals having different frequencies, respectively. For example, the waveform of 2 periods in a first frequency signal is selected to denote the bit 0, and the waveform of 3 periods in a second frequency signal is selected to represent the bit 1, thereby representing the bits 0 and 1 by using the waveforms that are different in period number and frequency, respectively. It should be noted that the waveform of 2 periods in the first frequency signal and the waveform of 3 periods in the second frequency signal here have the same time period, so that a receiver may accurately obtain the information to be transmitted by demodulation.

Figure 1:
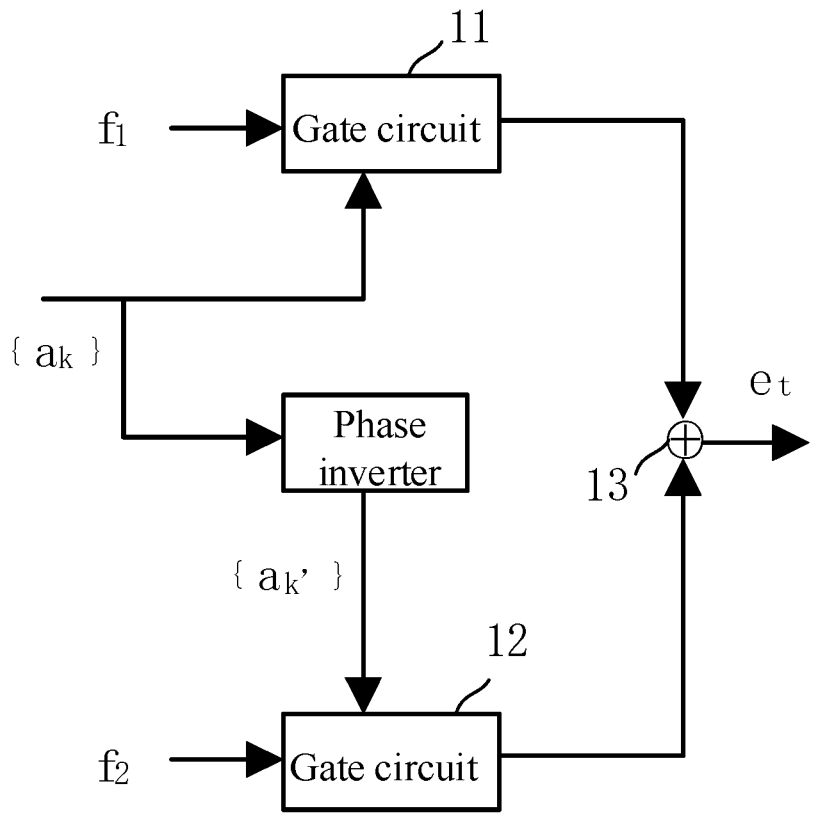
FIG. 1 is a schematic diagram showing a hardware for implementing frequency-shift keying (FSK) in the related art.

FIG. 1 is a schematic diagram showing a hardware for implementing FSK in the related art. Referring to FIG. 1, according to FSK, two frequency signals $f_1$ and $f_2$ are sent to inputs of the two gate circuits 11 and 12, respectively; the two gate circuits 11 and 12 are controlled to select waveforms respectively by an analog signal $\{a_k\}$ of the information to be transmitted and an inverted signal $\{a_k'\}$ of the analog signal; and then outputs of the two gate circuits 11 and 12 are added up by an adder 13 to obtain an output signal $e_r$, i.e., the clock signal. The frequency signal refers to high and low level periodic signals.

In the process above, one (i.e., $f_2$) of the two frequency signals $f_1$ and $f_2$ needs to be controlled by the inverted signal $\{a_k'\}$ of the analog signal of the information to be transmitted, resulting in a delay in the output of the gate circuit 12 relative to the output of the gate circuit 11, which is likely to cause an error in the number of waveforms in a time period, and eventually lead to a communication error since the receiver fail to correctly obtain data information by demodulation. The time period is a period of a predetermined length.

Figure 2:
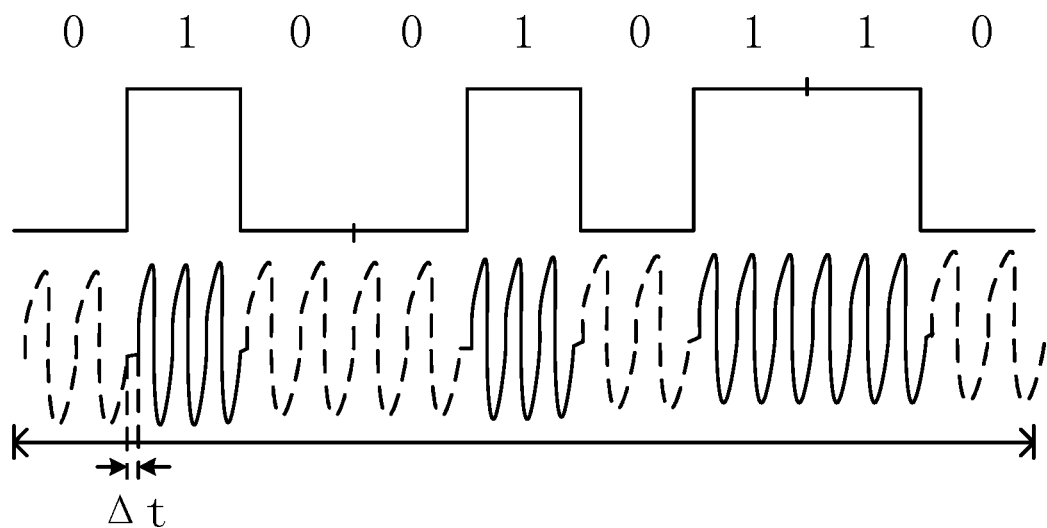
FIG. 2 is a waveform diagram of a clock signal generated by the hardware structure of FSK shown in FIG. 1.

FIG. 2 is a waveform diagram of a clock signal generated by the hardware structure of FSK shown in FIG. 1. Referring to FIG. 2, the bit 0 corresponds to a dotted line part in FIG. 2, and the bit 1 corresponds to a solid line part in FIG. 2. It can be seen that a significant delay is presented, i.e., the part shown by Δt in FIG. 2, between the solid line part and the dotted line part, and this delay may cause an error in the number of waveforms in one time period.

Figure 3:
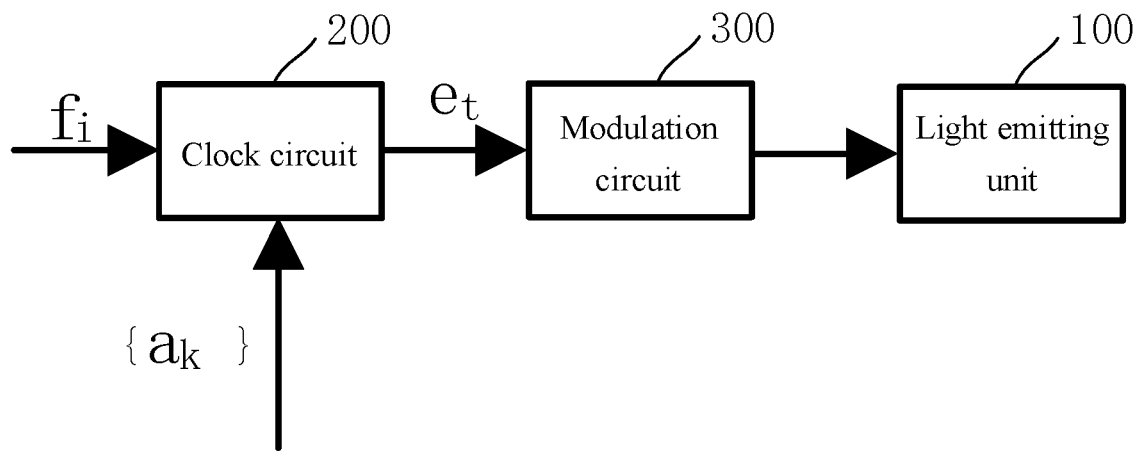
FIG. 3 shows a schematic structural diagram of an optical communication drive circuit according to an embodiment of the present disclosure.

FIG. 3 shows a schematic structural diagram of an optical communication drive circuit according to an embodiment of the present disclosure. Referring to FIG. 3, the optical communication drive circuit is applied to an optical communication transmitter, and includes a clock circuit 200 and a modulation circuit 300. One initial frequency signal is input to an input terminal of a clock circuit 200, and an analog signal corresponding to the information to be transmitted is input to a control terminal of the clock circuit 200; an output terminal of the clock circuit 200 is connected to an input terminal of a modulation circuit 300; and an output terminal of the modulation circuit 300 is connected to a control terminal of a light emitting unit 100 in the optical communication transmitter.

The clock circuit 200 is configured to input one initial frequency signal and output a clock signal under control of information to be transmitted. The clock signal includes alternating first and second frequency signals, wherein the first frequency signal and the second frequency signal have different frequencies and are generated based on the initial frequency signal. The modulation circuit 300 is configured to modulate an optical signal by the clock signal output by the clock circuit 200. The optical signal, generated by the light emitting unit 100, is modulated to obtain a modulated optical signal, for example, an optical pulse signal.

In the optical communication drive circuit, the lock signal is generated by the clock circuit, and includes alternating first and second frequency signals. The first frequency signal and the second frequency signal have different frequencies, but are generated based on the initial frequency signal. That is to say, the clock circuit may output the clock signal with one initial frequency signal as the input in combination with the control of the information to be transmitted. When the clock circuit generates a clock signal, since only one initial frequency signal is used as an input and the first frequency signal and the second frequency signal are then alternately generated under the control of the information to be transmitted, it is neither necessary to invert the analog signal of the information to be transmitted, nor to perform waveform selection on the two frequency signals by the analog signal of the information to be transmitted and the inverted signal to generate the clock signal. The optical communication drive circuit avoids output delays caused by processes such as inversion of the analog signal of the information to be transmitted and waveform selection by the inverted signal, and avoids bit errors caused by the output delay, thereby improving the communication quality. In addition, since the clock signal generated by the solution according to the present disclosure is subject to no delay, a smaller time period may be used to indicate the bits in the information to be transmitted, which may improve the data transmission rate.

As an example, referring to FIG. 3, the clock circuit 200 outputs a clock signal $e_r$ with the initial frequency signal fi as an input signal under the control of an analog signal $\{a_k\}$ of the information is to be transmitted.

Optionally, the initial frequency signal may be generated by a voltage-controlled oscillator. For example, an inductance-capacitance voltage-controlled oscillator (LCVCO) may be used as a vibration source, to generate the initial frequency signal. That is, the optical communication drive circuit may further include a voltage-controlled oscillator, and an output of the voltage-controlled oscillator is electrically connected to the input of the clock circuit 200.

The information to be transmitted may be generated by a device configured with the optical communication transmitter. For example, in case where the optical communication transmitter is an optical communication transmitter on an automobile, the information to be transmitted may be generated by a vehicular computer of the automobile, and the information to be transmitted generated by the vehicular computer of the automobile may be an analog signal, which may be directly output to the clock circuit 200.

In this embodiment, the clock signal is generated with the initial frequency signal as a reference. That is, in this embodiment of the present disclosure, the frequency of a part (the first frequency signal) in the clock signal corresponding to the bit 0 in the information to be transmitted is proportional to the frequency of the initial frequency signal; the frequency of the part (the second frequency signal) in the clock signal corresponding to the bit 1 in the information to be transmitted is also proportional to the frequency of the initial frequency signal; and a ratio of the frequency of the first frequency signal to the frequency of the initial frequency signal is different from a ratio of the frequency of the second frequency signal to the frequency of the initial frequency signal. This is different from the related art where the frequencies of the parts in the clock signal corresponding to the bits 0 and 1 in the information to be transmitted are proportional to the frequencies of the two frequency signals respectively. Herein, the term "proportional" means that the first frequency signal or the second frequency signal is obtained by multiplying the frequency of the clock signal by a value, wherein the value is an integer or a finite decimal.

Optionally, the light emitting unit 100 may be a laser device. The laser generated by the laser device has advantages such as good monochromaticity and high brightness, and is particularly suitable for being used as a light source for the optical communication.

Accordingly, the modulation circuit 300 may be a laser modulator, which is configured to modulate the laser generated by the laser device to obtain a modulated laser signal. The laser modulator may control the on/off of the laser by the high and low levels of the clock signal, thereby generating a laser pulse signal. The laser pulse signal is the modulated laser signal carrying the information to be transmitted.

Figure 4:
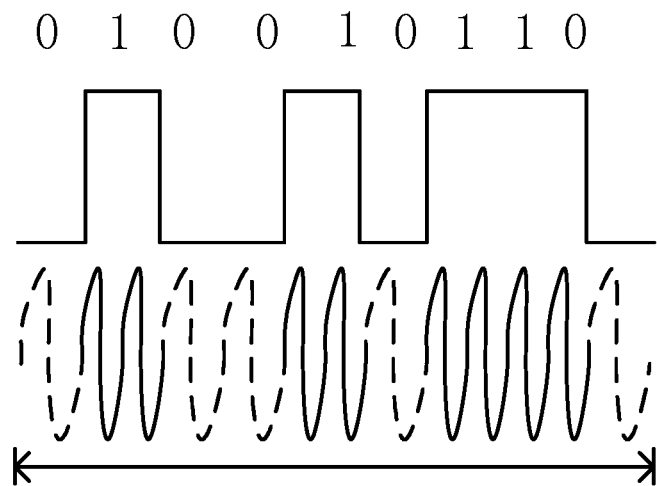
FIG. 4 is a waveform diagram of a clock signal generated by the clock circuit in FIG. 3.

FIG. 4 is a waveform diagram of a clock signal generated by the clock circuit in FIG. 3. Referring to FIG. 4, the bit 0 corresponds to the dotted line part in FIG. 4, and the bit 1 corresponds to the solid line part in FIG. 4. It can be seen that there is no delay between the solid line part and the dashed line part, thereby avoiding bit errors caused by the delay. In addition, in the waveform diagrams provided in FIG. 4 and FIG. 2, the frequency of all the signals representing the bit 1 is $f_1$, and the frequency of all the signals representing the bit 0 is $f_2$. It can be seen that in FIG. 2, the bit 1 is represented by the $f_1$ waveform of 3 periods, and the bit 0 is represented by the $f_2$ waveform of 2 periods; and in FIG. 4, the bit 1 is represented by the $f_1$ waveform of 2 periods, and the bit 0 is represented by the $f_2$ waveform of 1 period. Therefore, when representing a single bit in the information to be transmitted, the clock signal generated by the clock circuit in FIG. 3 may occupy a shorter time period, thereby reducing the transmission time in the case of transmitting the same amount of data. That is, the optical communication drive circuit according to the present disclosure may make the transmission time shorter, i.e., making the transmission bandwidth wider.

Figure 5:
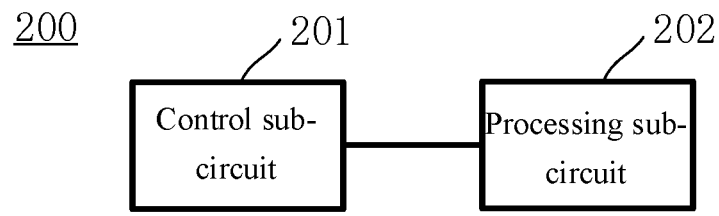
FIG. 5 shows a schematic structural diagram of a clock circuit according to an embodiment of the present disclosure.

FIG. 5 shows a schematic structural diagram of a clock circuit according to an embodiment of the present disclosure. Referring to FIG. 5, the clock circuit 200 may include:

a control sub-circuit 201 configured to generate a sequence of control words according to the information to be transmitted, with the sequence of control words including alternating first and second control words; and a processing sub-circuit 202 configured to obtain the first frequency signal based on a frequency of the initial frequency signal and the first control word in the sequence of control words generated by the control sub-circuit 201, and obtain the second frequency signal based on the frequency of the initial frequency signal and the second control word in the sequence of control words generated by the control sub-circuit 201.

As an example, the processing sub-circuit 202 is configured to output the clock signal of a frequency equal to the frequency of the initial frequency signal divided by the control words, where the frequency of the first frequency signal in the clock signal is equal to the frequency of the initial frequency signal divided by a first control word, and the frequency of the second frequency signal in the clock signal is equal to the frequency of the initial frequency signal divided by a second control word.

Here, the sequence of control words refers to a signal for controlling the frequency of the clock signal, and is generated according to the information to be transmitted. In this way, the receiver may restore the information to be transmitted by demodulating the received signal.

Since the frequency of the clock signal generated by the clock circuit is equal to the frequency of the initial frequency signal divided by the control words, the generation of the clock signal of any frequency may be implemented by controlling the control words. Compared with the related art that the frequency of the clock signal is fixed, the diversity of the clock signal is enriched. In addition, since the sequence of control words includes the alternating first and second control words, and the frequency of the clock signal is equal to the frequency of the initial frequency signal divided by the control words, the clock signal output by the processing sub-circuit 202 includes the alternating first and second frequency signals.

According to the foregoing description, it can be known that the information to be transmitted is a binary bit stream containing binary bits 0 and 1. When the information to be transmitted is directly used to control the frequency of the clock signal, only two frequencies corresponding to the bits 0 and 1 may be generated, and the two frequencies are fixed. However, the bits 0 and 1 may be mapped to different control words with the control words above. That is to say, the first control words in different sequences of control words may be different, the second control words in different sequences of control words may also be different, and different frequencies may be selected by different control words to achieve the output of clock signals of different frequencies.

For example, if the frequency of the clock signal output by the clock circuit 200 is $f_o$, the frequency of the initial frequency signal is $f_i$, and the control word is F, then $f_o = f_i/F$. It is known from the above formula that the frequency of the output clock signal may be precisely controlled by the control word.

In this embodiment of the present disclosure, the alternating first and second control words correspond to the alternating bits 0 and 1 in the information to be transmitted, and the "alternating" herein is not limited to the alternation of one 0 and one 1, and may be the alternation of an unlimited number of 0s and an unlimited number of 1s.

Accordingly, the alternating first and second control words may also be the alternation of an unlimited number of the first control words and an unlimited number of the second control words. For example, the information to be transmitted is 10011101, where the alternating 0 and 1 here is neither limited to the alternation of one 0 and one 1, nor limited to the alternation of a certain number of 1s and the same number of 1s.

In an implement of this embodiment of the present disclosure, the control sub-circuit 201 is configured to sequentially select, based on a corresponding relationship between bits and control words, control words corresponding to respective bits in the information to be transmitted according to an order of the bits in the information to be transmitted, to obtain the sequence of control words.

By selecting the control words in this way in advance, the clock circuit may output the clock signal having a frequency which corresponds to the control words and meets the communication requirement. Moreover, due to the corresponding relationship above, the same bits in the information to be transmitted correspond to the same waveform in the clock signal, thereby ensuring correct demodulation at the receiver.

For example, in the corresponding relationship between the bits and the control words, the bit 0 corresponds to a first value (i.e., the first control word in the sequence of control words), and the bit 1 correspond to a second value (i.e., the second control word in the sequence of control words). The control sub-circuit 201 sequentially selects corresponding values as the control words according to the order of the bits in the information to be transmitted, and controls the output of the clock signal. For example, when the bits in the information to be transmitted is 10010, the control sub-circuit 201 sequentially selects the second value, the first value, the first value, the second value, and the first value for periodically controlling the processing sub-circuit 202, so as to control the output of the processing sub-circuit 202.

The control sub-circuit 201 may include at least two control word registers for storing the above control words. When the control sub-circuit 201 receives the information to be transmitted, the corresponding control words may be read from the registers according to the corresponding bits. The above corresponding relationship between the bits and the control words may include a mapping relationship between the bits and register addresses, for example, the bit 0 is mapped to an address of the register storing first values, and the bit 1 is mapped to an address of the register storing second values.

In an implement of this embodiment of the present disclosure, the control sub-circuit 201 is configured to select the corresponding relationship between the bits and the control words according to communication modes. The corresponding relationship between the bits and the control words is at least partially different in different communication modes.

By correlating the control words with communication modes, different modes thus may be selected during communication for generating the clock signals having different frequencies to communicate with a peer (the receiver), which makes the communication more flexible.

In the implement above, a bit refers to information contained in a binary digit, for example, a bit 0 or a bit 1.

For example, the optical communication transmitter may have three communication modes, where the first communication mode corresponds to a first corresponding relationship between the bits and the control words; the second communication mode corresponds to a second corresponding relationship between the bits and the control words; and the third communication mode corresponds to a third corresponding relationship between the bits and the control words. As an example, in the first corresponding relationship between the bits and the control words, the bit 0 corresponds to the first value, and the bit 1 corresponds to the second value. As an example, in the second corresponding relationship between the bits and the control words, the bit 0 corresponds to a third value, and the bit 1 corresponds to a fourth value. As an example, in the third corresponding relationship between the bits and the control words, the bit 0 corresponds to a third value, and the bit 1 corresponds to a fifth value. It can be seen that in the first and second communication modes, both the bits 0 and 1 correspond to different control words respectively, that is, the corresponding relationships between the bits and control words are completely different in the first and second communication modes; and in the second and third communication modes, the bits 0 correspond to the same control words, but the bits 1 correspond to different control words, that is, the corresponding relationships between the bits and control words are partially different in the second and third communication modes.

In this implement, each communication mode corresponds to a mapping relationship between the bits and the register addresses. For example, in the first communication mode, the bit 0 is mapped to the address of the register storing the first value, and the bit 1 is mapped to the address of the register storing the second value; in the second communication mode, the bit 0 is mapped to the address of the register storing the third value, and the bit 1 is mapped to the address of the register storing the fourth value; and in the third communication mode, the bit 0 is mapped to the address of the register storing the third value, and the bit 1 is mapped to the address of the register storing the fifth value.

In this embodiment of the present disclosure, the communication modes may be set as required. For example, the communication modes may include a private communication mode and an open communication mode. The private communication mode may be customized at both the receiver and transmitter, which only allow the receiver and the transmitter to modulate and demodulate the data information. The open communication mode may be a standard communication mode, which allow any transmitter and any receiver to modulate and demodulate the data information.

It should be noted that when the optical communication transmitter adopts one of the above communication modes for signal modulation, the receiver must also adopt the same communication mode for signal demodulation accordingly. For example, if the transmitter selects the control words for generating the clock signal to be used in optical modulation in the first communication mode, accordingly, the receiver must also perform demodulation in the first communication mode to obtain the data information (i.e., the information to be transmitted) according to a corresponding relationship between the waveforms and data bits in the communication mode.

On the premise that the transmitter determines the control word corresponding to each bit and thus determines a waveform in the clock signal corresponding to each bit, the relationship between the waveforms and the bits of the signal received by the receiver is also determined. As an example, a corresponding relationship between the waveforms and the data bits in each communication mode may be stored in the receiver in advance, and the receiver may select the corresponding relationship between the waveforms and the data bits in the corresponding communication mode when performing data demodulation.

In addition, in an optical communication process, the communication modes of the transmitter and the receiver terminal may be determined by negotiation, the details of which are not limited in the present disclosure.

Figure 6:
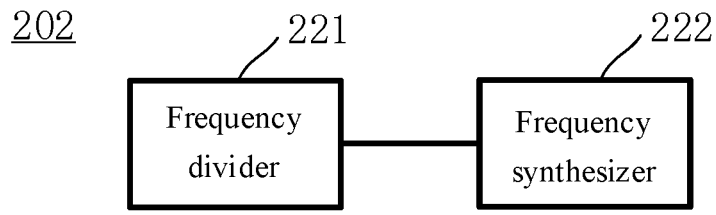
FIG. 6 shows a schematic structural diagram of a processing sub-circuit according to an embodiment of the present disclosure.

FIG. 6 shows a schematic structural diagram of a processing sub-circuit according to an embodiment of the present disclosure. Referring to FIG. 6, the processing sub-circuit 202 includes a frequency divider 221 and a frequency synthesizer 222. The input of the frequency divider 221 inputs one initial frequency signal, the output of the frequency divider 221 is connected to an input of the frequency synthesizer 222, and an output of the frequency synthesizer 222 is connected to the modulation circuit 300.

The frequency divider 221 is configured to generate K signals having uniformly spaced phases according to the initial frequency signal, with K being an integer greater than 2. The frequency synthesizer 222 is configured to generate the first frequency signal based on the K signals having uniformly spaced phases generated by the frequency divider 221 and the first control word, and to generate the second frequency signals based on the K signals having uniformly spaced phases and the second control word, to obtain the clock signal.

In this implement, the processing sub-circuit consists of two parts, where the frequency divider is responsible for generating K signals having uniformly spaced phases according to the frequency signal, and the frequency synthesizer is responsible for generating the clock signal according to the K signals having uniformly spaced phases and the control words.

Figure 7:
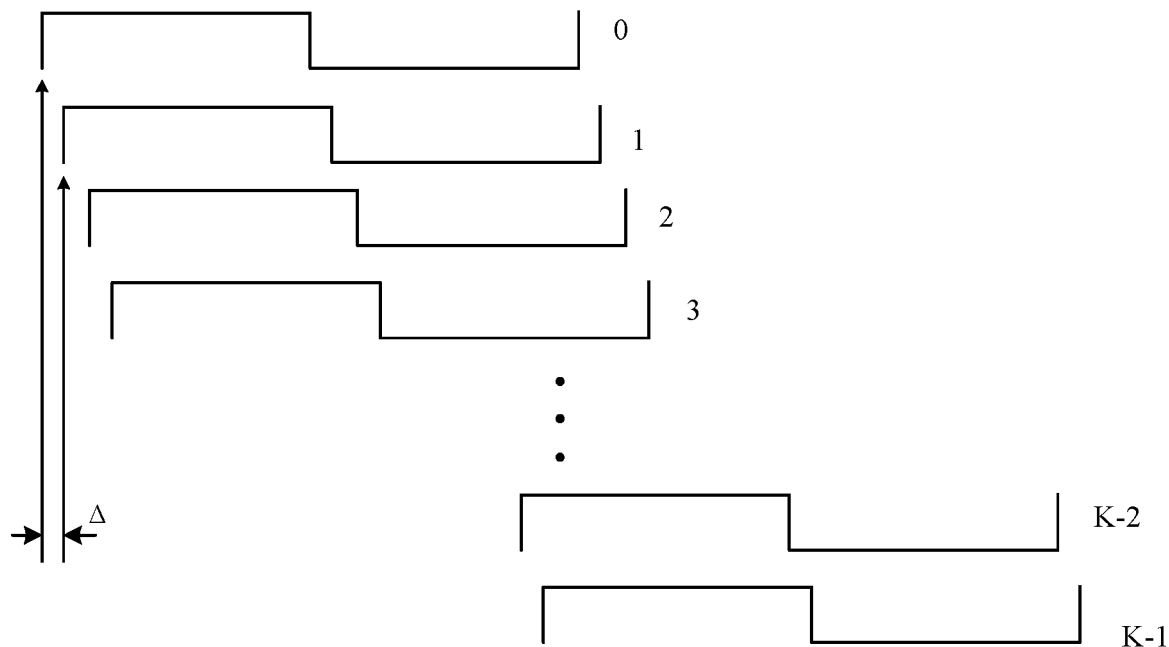
FIG. 7 is a waveform diagram of K signals having uniformly spaced phases generated by the frequency divider in FIG. 6.

FIG. 7 is a waveform diagram of K signals having uniformly spaced phases generated by the frequency divider in FIG. 6. Referring to FIG. 7, the waveforms of any two signals are the same (that is, the period and amplitude are the same); the waveforms of K signals are evenly distributed; a phase difference between any two adjacent signals is a basic time unit $\Delta$; and the frequency of all K signals is $f_t$, with K being an integer greater than 1.

In this embodiment of the present disclosure, the frequency divider 221 may be implemented by a Johnson counter (also referred to as a twisted-ring counter) to generate the K signals having uniformly spaced phases. The frequency divider 221 may also be implemented by a rotary traveling-wave oscillator (RTWO), which is a clock generation technology based on a transmission line, and may readily generate the K signals having uniformly spaced phases. Beyond this, the frequency divider 221 may also be implemented by a differential latch for generating the above K signals having uniformly spaced phases.

In this embodiment of the present disclosure, the frequency synthesizer 222 may be a time average frequency (TAF) direct period synthesis (DPS) frequency synthesizer. Here, TAF refers to the number of waveforms of different widths in a fixed time period. As an example, in this embodiment of the present disclosure, the number of waveforms in a time period is used to denote whether the data carried by the optical signal is 0 or 1 by the TAF technology. For example, the bits 0 and 1 in the information to be transmitted are mapped as 2 waveforms and 3 waveforms in the same time period, respectively.

In an implement of this embodiment of the present disclosure, the frequency synthesizer 222 is configured to generate a first periodic signal and a second periodic signal based on the K signals having uniformly spaced phases and the first control word, and further generate the first frequency signal based on the first periodic signal and the second periodic signal; and to generate a third periodic signal and a fourth periodic signal based on the K signals having uniformly spaced phases and the second control word, and further generate the second frequency signal based on the third periodic signal and the fourth periodic signal.

In an implement of this embodiment of the present disclosure, the frequency synthesizer 222 is configured to generate the first periodic signal, the second periodic signal, the third periodic signal and the fourth periodic signal according to a formula as follows: $T_A=I*\Delta$, $T_B=(I+1)*\Delta$, $T_C=J*\Delta$, $T_D=(J+1)*\Delta$. In this formula, $\Delta$ represents a phase difference between any two adjacent signals of the K signals having uniformly spaced phases, I represents an integer part in the first control word, J represents an integer part in the second control word, $T_A$ represents the first periodic signal, $T_B$ represents the second periodic signal, $T_C$ represents the third periodic signal, and $T_D$ represents the fourth periodic signal.

In this embodiment of the present disclosure, the sequence of control words includes the alternating first and second control words. Both the first and second control word may be integers or decimals, and each value may thus be split into an integer part and a decimal part. For example, if the first control word is 5.4, then the integer part is 5 and the decimal part is 0.4. For another example, if the second control word is 6, then the integer part is 6 and the decimal part is 0.

In a implement of the embodiment of the present disclosure, the frequency synthesizer 222 is configured to generate a first frequency signal and a second frequency signal according to a formula as follows: $T_{TAF1}=(1-r)*T_A+r*T_B$, $T_{TAF2}=(1-s)*T_C+s*T_D$. In this formula, $T_{TAF1}$ represents a period of the first frequency signal, r represents the decimal part in the first control word, with $0 \leq r < 1$, $T_{TAF2}$ represents a period of the second frequency signal, and s represents the decimal part in the second control word, with $0 \leq s < 1$.

When the decimal part in the first control word is 0, the first frequency signal is composed of only one periodic signal of $T_A$; and when the decimal part in the second control word is 0, the second frequency signal is composed of only one periodic signal of $T_C$.

Figure 8:
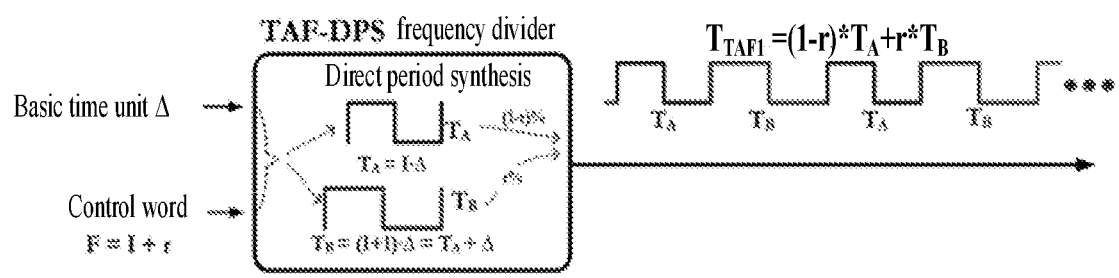
FIG. 8 is a schematic diagram showing the synthesis of a clock signal by a TAF-DPS frequency synthesizer.

FIG. 8 is a schematic diagram showing the synthesis of a clock signal by a TAF-DPS frequency synthesizer. Referring to FIG. 8, the TAF-DPS frequency synthesizer synthesizes and outputs a clock signal by means of the concept of time average frequency. In the following, the synthesis of the first frequency signal is described by way of example, where the TAF-DPS frequency synthesizer receives K signals having uniformly spaced phases and the first control word, respectively. With the first control word F=I+r, I represents an integer part and r represents a decimal part; a phase difference between any two adjacent signals of the K signals having uniformly spaced phases is a basic time unit $\Delta$. The TAF-DPS frequency synthesizer first constructs two different clock periods $T_A$ and $T_B$ according to the basic time unit $\Delta$ and the first control word F, where $T_A=I \cdot \Delta$ and $T_B=(I+1) \cdot \Delta$. Afterwards, the TAF-DPS frequency synthesizer generates a first frequency signal by alternately generating the two clock periods, and the first frequency signal may include two parts of the clock periods $T_A$ and $T_B$. The period of the finally output first frequency signal may be calculated by the formula $T_{TAF1}=(1-r)*T_A+r*T_B=F*\Delta$, and the occurrence probability of $T_A$ or $T_B$ is controlled by the value of r. Assuming that hardware resources for generating the r bits meet the requirements, any frequency may be generated by the TAF-DPS frequency synthesizer. In addition, since each individual pulse is directly generated, the output first frequency signal may be changed immediately. The TAF-DPS frequency synthesizer may achieve the output of the clock signal by alternately generating the first signal and second frequency signal.

Figure 9:
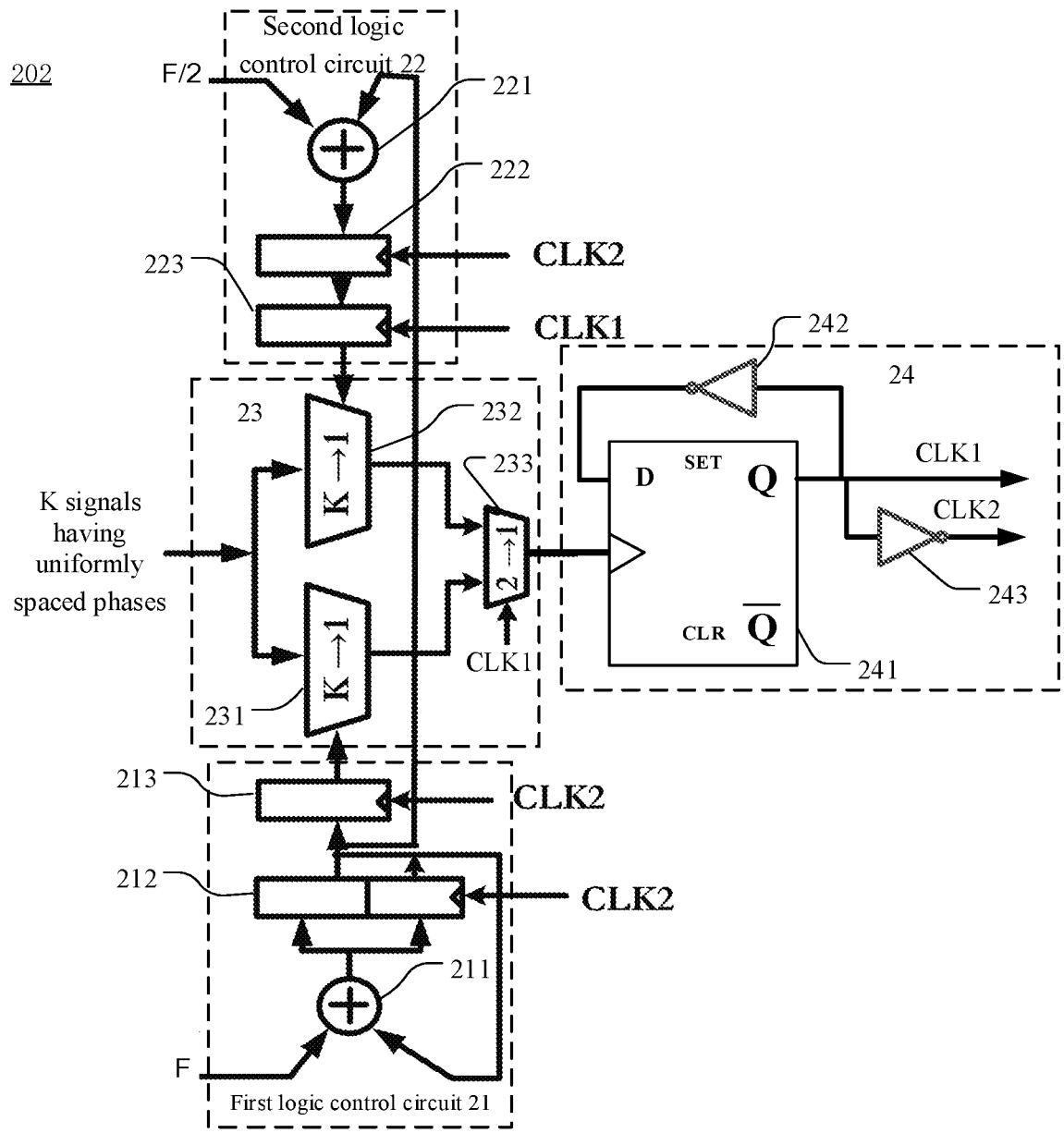
FIG. 9 is a schematic structural diagram of a TAF-DPS frequency synthesizer according to the present disclosure.

FIG. 9 is a schematic structural diagram of the TAF-DPS frequency synthesizer according to the present disclosure. Referring to FIG. 9, the TAF-DPS frequency synthesizer may include a first input module, a second input module 23, and an output module 24. The first input module includes a first logic control circuit 21 and a second logic control circuit 22.

Referring to FIG. 9, the second input module 23 includes a first K-to-1 multiplexer 231, a second K-to-1 multiplexer 232, and a 2-to-1 multiplexer 233. Each of the first K-to-1 multiplexer 231 and the second K-to-1multiplexer 232 includes a plurality of inputs for receiving K signals having uniformly spaced phases, a control input, and an output. The 2-to-1multiplexer 233 includes a control input, an output, a first input for receiving an output of the first K-to-1multiplexer 231, and a second input for receiving an output of the second K-to-1multiplexer 232.

The control input of the first K-to-1multiplexer 231 selects an output signal from the K signals having uniformly spaced phases under the control of the first logic control circuit 21, and the control input of the second K-to-1multiplexer 232 selects an output signal from the K signals having uniformly spaced phases under the control of the second logic control circuit 22.

The 2-to-1multiplexer 233 may select either a first output signal from the first K-to-1multiplexer 231 or a second signal from the second K-to-1multiplexer at the rising edge of the first clock signal CLK1, as an output signal of the 2-to-1multiplexer 233.

Referring to FIG. 9, the first logic control circuit 21 includes a first adder 211, a first register 212, and a second register 213. The second logic control circuit 22 includes a second adder 221, a third register 222, and a fourth register 223.

The first adder 211 may add a first control word F to the most significant bits (for example, 5 bits) stored in the first register 212, and then the addition result is stored in the first register 121 at the rising edge of the second clock signal CLK2. Or, the first adder 211 may add the first control word F to all the information stored in the first register 212, and then the addition result is stored in the first register 212 at the rising edge of the second clock signal CLK2. At the rising edge of the next second clock signal CLK2, the most significant bits stored in the first register 212 will be stored in the second register 213 and used as a selection signal of the first K-to-1multiplexer 231 for selecting one signal from K multi-phase input signals, as the first output signal of the first K-to-1multiplexer 231.

The second adder 221 may add half F/2 of the first control word and the most significant bits stored in the first register 212, and then save an addition result in the third register 222 at the rising edge of the second clock signal CLK2. At the rising edge of the next first clock signal CLK1, the information stored in the third register 222 will be stored in the fourth register 223, and used as a selection signal of the second K-to-1 multiplexer 223 for selecting one signal from the K multi-phase input signals, as the second output signal of the second K-to-1multiplexer 223.

Referring to FIG. 9, the output module 24 includes a trigger circuit. The trigger circuit is configured to generate a burst. The trigger circuit includes a D trigger 241, a first inverter 242, and a second inverter 243. The D trigger 241 includes a data input, a clock input for receiving an output from the output of the 2-to-1multiplexer 233, and an output for outputting the first clock signal CLK1. The first inverter 242 includes an input for receiving the first clock signal CLK1 and an output for outputting a signal to a data input of the D trigger 241. The second inverter 243 includes an input for receiving the first clock signal CLK1 and an output for outputting the second clock signal CLK2. An output of the trigger circuit or the output of the second inverter 243 may act as the output of the TAF-DPS frequency synthesizer, i.e., for generating the clock signal.

The first clock signal CLK1 is connected to the control input of the 2-to-1 multiplexer 233, and the output of the first inverter 242 is connected to the data input of the D trigger 241.

Optionally, the optical communication drive circuit may further include a filter, which is connected between the output of the clock circuit 200 and the input of the modulation circuit 300. The filter is configured to filter the clock signal output by the clock circuit 200 and then input the filtered clock signal to the modulation circuit 300.

Figure 10:
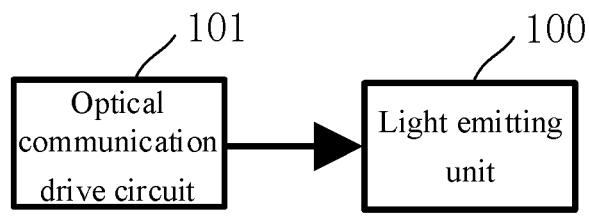
FIG. 10 shows a schematic structural diagram of an optical communication transmitter according to an embodiment of the present disclosure.

FIG. 10 shows a schematic structural diagram of an optical communication transmitter according to an embodiment of the present disclosure. Referring to FIG. 10, the optical communication transmitter includes a light emitting unit 100 and the optical communication drive circuit 101 shown in FIG. 3. The optical communication drive circuit 101 is configured to modulate an optical signal generated by the light emitting unit 100 to obtain a modulated optical signal.

Figure 11:
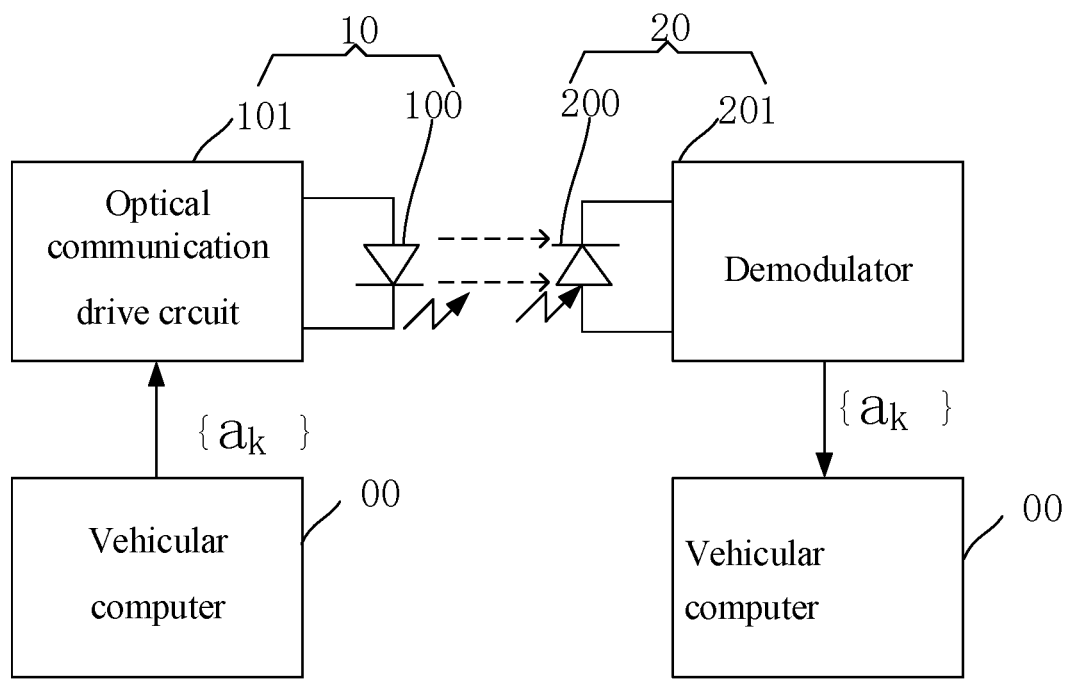
FIG. 11 shows a schematic structural diagram of an optical communication system according to an embodiment of the present disclosure.

FIG. 11 shows a schematic structural diagram of an optical communication system according to an embodiment of the present disclosure. Referring to FIG. 11, the system includes a transmitter 10 and a receiver 20. The transmitter 10 is the optical communication transmitter as shown in FIG. 10.

In this embodiment of the present disclosure, the receiver 20 includes a photodetector 200 and a demodulator 201, and an output of the photodetector 200 is connected to an input of the demodulator 201. The photodetector 200 is configured to receive an optical signal and convert the optical signal into an electrical signal; and the demodulator 201 is configured to demodulate the electric signal to obtain the data information, i.e., the information to be transmitted of the transmitter.

Optionally, the receiver 20 may further include an amplifier, which is connected between the output of the photodetector and the input of the modulation circuit. The amplifier is configured to amplify the electric signal output by the photodetector, so that the electric signal input to the demodulator is large enough to accurately obtain the data information by demodulation.

In an implement of this embodiment of the present disclosure, the photodetector 200 may be a photodiode, for example, an avalanche photo diode (APD).

In an implement of this embodiment of the present disclosure, the demodulator demodulates the signal in the same communication mode as that of the transmitter. For example, if the transmitter selects the control words for generating the clock signal to be used in optical modulation in the first communication mode, accordingly, the demodulator also needs to perform demodulation in the first communication mode to obtain the data information (i.e., the information to be transmitted) according to a relationship between the waveform and data bits in the communication mode. As an example, the relationship between the waveform and the data bit in each communication mode may be stored in the demodulator in advance.

When the above optical communication system is applied to a vehicle, as shown in FIG. 11, the input of the transmitter 10 is electrically connected to an output of a vehicular computer 00, and the output of the receiver 20 is electrically connected to an input of the vehicular computer 00. The vehicular computer 00 transmits the information to be transmitted to the transmitter 10, and the transmitter 10 transmits the information to be transmitted to the vehicular computer 00 connected to the receiver 20 by an optical signal. In FIG. 11, the two vehicular computers 00 are located on different vehicles respectively.

At least one embodiment of the present disclosure provides a vehicle. The vehicle includes an optical communication transmitter as shown in FIG. 10.

In the vehicle, the information to be transmitted received by the optical communication transmitter may be provided by a control computer (such as the vehicular computer) in the vehicle.

In the embodiment of the present disclosure, the vehicle further includes a receiver, which may be a receiver in the optical communication system shown in FIG. 10, and is configured to receive an optical signal, convert the optical signal into an electrical signal, and then demodulate the electric signal to obtain data information. The data information demodulated from the receiver may be output to the control computer in the vehicle.

In this embodiment of the present disclosure, the optical communication transmitter and the receiver may be disposed at a head or tail of the vehicle.

Taking an automobile as an example, the automobile may be provided at the head with both the transmitter and the receiver for optical communication, so as to communicate with other automobiles by the transmitter and receiver at the head of the automobile. The automobile may also be provided at the tail with both the transmitter and the receiver for optical communication, to communicate with other automobiles by the transmitter and receiver at the tail of the automobile. In addition to being disposed at the head and the tail, the transmitter and the receiver for the optical communication may also be disposed on other sites of the automobile, which is not limited in the present disclosure.

Since the transmitter and the receiver for the optical communication may be disposed at either the head or the tail of the vehicle, the vehicle may have two communications modes below, which will be explained in combination with FIG. 12 and FIG. 13.

Figure 12:
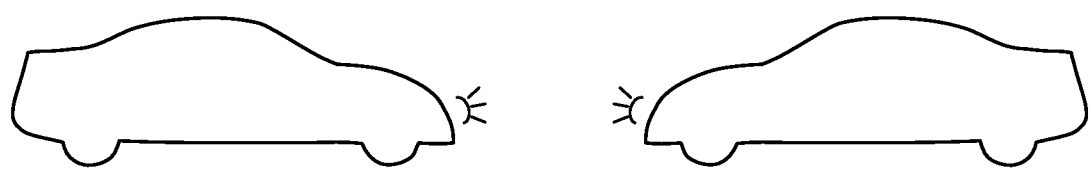
FIG. 12 shows a schematic diagram illustrating a manner of communication between vehicles according to an embodiment of the present disclosure.

FIG. 12 shows a schematic diagram illustrating a manner of communication between vehicles according to an embodiment of the present disclosure. Referring to FIG. 12, when two vehicles are running towards each other (meeting), the two vehicles carry out optical communication with each other by the transmitters and the receivers disposed at the heads.

Figure 13:
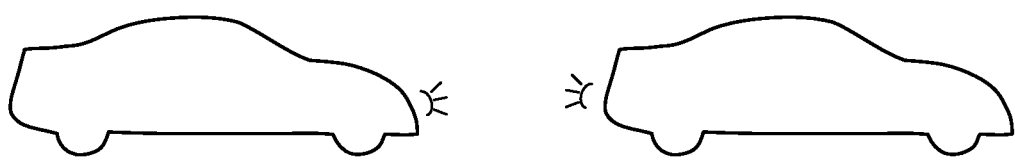
FIG. 13 shows a schematic diagram illustrating another manner of communication between vehicles according to an embodiment of the present disclosure.

FIG. 13 shows a schematic diagram illustrating another manner of communication between vehicles according to an embodiment of the present disclosure. Referring to FIG. 13, when two vehicles are running in the same direction, the rear vehicle may communicate with the front vehicle by communication of the transmitter and receiver disposed at the head of the rear vehicle with the transmitter and receiver disposed at the tail of the front vehicle.

In this embodiment of the present disclosure, the vehicle includes, but is not limited to, automobiles, and may also be other vehicles such as airplanes and trains.

Figure 14:
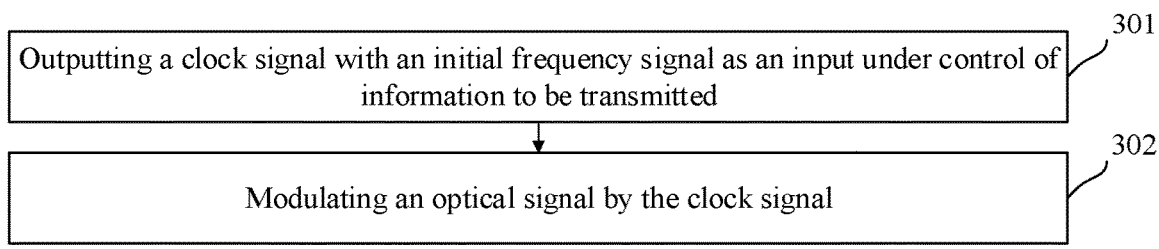
FIG. 14 shows a flowchart of an optical communication drive method according to an embodiment of the present disclosure.

FIG. 14 shows a flowchart of an optical communication drive method according to an embodiment of the present disclosure. This method may be executed by the optical communication drive circuit shown in FIG. 3. Referring to FIG. 14, the method includes the following steps.

In step 301, a clock signal is output with one initial frequency signal as an input under control of information to be transmitted.

The clock signal includes alternating first and second frequency signals. The first frequency signal and the second frequency signal have different frequencies but are generated based on the initial frequency signal.

In this embodiment of the present disclosure, the initial frequency signal may also be generated by a voltage-controlled oscillator. For example, an inductance-capacitance voltage-controlled oscillator (LCVCO) is used as a vibration source to generate the initial frequency signal above.

Step 301 may be executed by the clock circuit in the optical communication drive circuit shown in FIG. 3.

In step 302, an optical signal is modulated by the clock signal to obtain a modulated optical signal.

In this embodiment of the present disclosure, the optical signal may be a laser generated by a laser device. The laser has advantages such as good monochromaticity and high brightness, and is particularly suitable for being used as a light source for the optical communication.

Accordingly, modulating the optical signal by the clock signal corresponds to modulate the laser generated by the laser device, so as to obtain a modulated laser signal. For example, the on/off of the laser device may be controlled by the high and low levels of the clock signal, thereby generating a laser pulse signal. The laser pulse signal is the modulated laser signal carrying the foregoing information to be transmitted.

Step 302 may be executed by the modulation circuit in the optical communication drive circuit shown in FIG. 3.

In this optical communication drive method, the generated clock signal includes alternating first and second frequency signals. The first frequency signal and the second frequency signal have different frequencies, but are generated based on the initial frequency signal. That is to say, the clock signal may be output with one initial frequency signal as the input in combination with the control of the information to be transmitted. When the clock signal is generated, since only one initial frequency signal is used as an input, and the first frequency signal and the second frequency signal are then alternately generated under the control of the information to be transmitted, it is neither necessary to invert the analog signal of the information to be transmitted, nor to perform waveform selection on the two frequency signals by the analog signal of the information to be transmitted and the inverted signal to generate the clock signal. The optical communication drive circuit avoids output delays caused by processes such as inversion of the analog signal of the information to be transmitted and waveform selection by the inverted signal, and avoids bit errors caused by the output delay, thereby improving the communication quality. In addition, since the clock signal generated by the solution according to the present disclosure has no delay, a smaller time period may be used to indicate the bits in the information to be transmitted, which can improve the data transmission rate.

Figure 15:
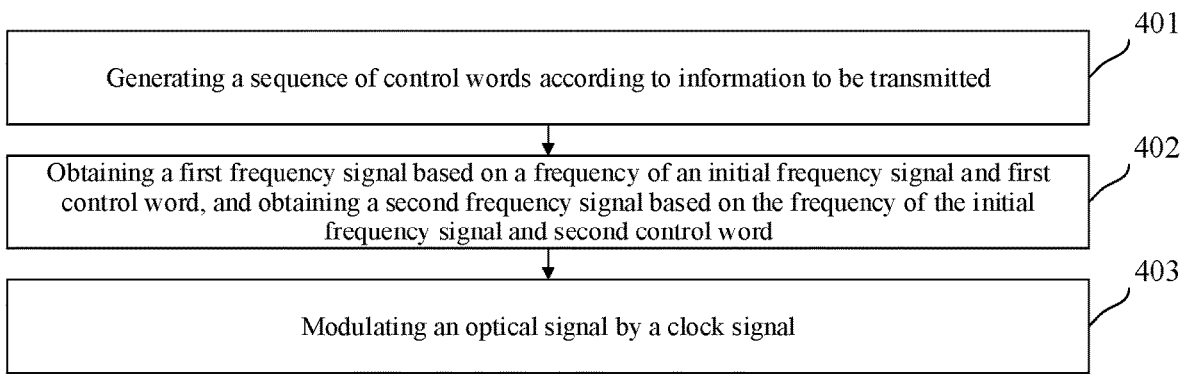
FIG. 15 shows a flowchart of an optical communication drive method according to an embodiment of the present disclosure.

FIG. 15 shows a flowchart of an optical communication drive method according to an embodiment of the present disclosure. This method may be executed by the optical communication drive circuit shown in FIG. 3. Referring to FIG. 15, the method includes the following steps.

In step 401, a sequence of control words including alternating first and second control words is generated according to the information to be transmitted.

In an implement of this embodiment of the present disclosure, generating the sequence of control words according to the information to be transmitted, and the sequence of control words including the alternating first and second control words includes: sequentially selecting control words corresponding to respective bits in the information to be transmitted according to an order of the bits in the information to be transmitted based on a corresponding relationship between the bits and the control words, to obtain the sequence of control words.

By selecting the control words in this way in advance, the clock circuit may output the clock signal having a frequency which corresponds to the control words and meets the communication requirement.

In an implement of this embodiment of the present disclosure, before sequentially selecting, based on the corresponding relationship between the bits and the control words, control words corresponding to the respective bits in the information to be transmitted according to the order of the bits in the information to be transmitted, generating the sequence of control words according to the information to be transmitted further includes: selecting the corresponding relationship between the bits and the control words according to communication modes, wherein the corresponding relationship between the bits and the control words is at least partially different in different communication modes.

By correlating the control words with communication modes, different modes thus may be selected during communication for generating the clock signals of different frequencies, which makes the communication more flexible when communicating with a peer terminal (the receiver). For example, the optical communication may be performed in the private communication mode or the open communication mode based on the clock signals of different frequencies.

In step 402, a first frequency signal is obtained based on a frequency of the initial frequency signal and the first control word, and a second frequency signal is obtained based on the frequency of the initial frequency signal and the second control word.

The clock signal includes alternating first and second frequency signals. The first frequency signals and the second frequency signals have different frequencies but are generated based on the initial frequency signal. The frequency of the first frequency signal in the clock signal is equal to the frequency of the initial frequency signal divided by a first control word, and the frequency of the second frequency signal in the clock signal is equal to the frequency of the initial frequency signal divided by a second control word.

In this embodiment of the present disclosure, the initial frequency signal may also be generated by a voltage-controlled oscillator. For example, an inductance-capacitance voltage-controlled oscillator (LCVCO) serves as a vibration source to generate the initial frequency signal above.

By step 401 and step 402, the output of the clock signal is achieved with one initial frequency signal as the input and under the control of information to be transmitted. Steps 401 and 402 may be executed by the clock circuit in the optical communication drive circuit shown in FIG. 3.

Since the generated frequency of the clock signal is equal to the frequency of the initial frequency signal divided by the control words, the clock signal having any frequency may be generated by controlling the control words. Compared with the related art that the frequency of the clock signal is fixed, the clock signals are diversified. In addition, since the sequence of control words includes the alternating first and second control words, and the frequency of the clock signal is equal to the frequency of the initial frequency signal divided by the control words, the output clock signal includes the alternating first and second frequency signals.

In an implement of this embodiment of the present disclosure, obtaining first frequency signal based on the frequency of the initial frequency signal and the first control word, and obtaining the second frequency signal based on the frequency of the initial frequency signal and the second control word include: generating K signals having uniformly spaced phases according to the initial frequency signal, with K being an integer greater than 2; and generating the first frequency signal based on the K signals having uniformly spaced phases and the first control word, and generating the second frequency signal based on the K signals having uniformly spaced phases and the second control word.

In this implement, the clock circuit consists of two parts, where the frequency divider is responsible for generating K signals having uniformly spaced phases according to the frequency signal, and the frequency synthesizer is responsible for generating the clock signal according to the K signals having uniformly spaced phases and the control words.

In an implement of this embodiment of the present disclosure, generating the first frequency signal based on the K signals having uniformly spaced phases and the first control words, and generating the second frequency signal based on the K signals having uniformly spaced phases and the second control words includes: generating a first periodic signal and a second periodic signal based on the K signals having uniformly spaced phases and the first control word, and further generating the first frequency signal based on the first periodic signal and the second periodic signal; and generating a third periodic signal and a fourth periodic signal based on the K signals having uniformly spaced phases and the second control word, and further generating the second frequency signal based on the third periodic signal and the fourth periodic signal.

In an implement of this embodiment of the present disclosure, generating the first periodic signal and the second periodic signal based on the K signals having uniformly spaced phases and the first control word, and generating the third periodic signal and the fourth periodic signal based on the K signals having uniformly spaced phases and the second control word includes:

generating the first periodic signal, the second periodic signal, the third periodic signal, and the fourth periodic signal according to a formula as follows:

$T_A=I*\Delta$, $T_B=(I+1)*\Delta$, $T_C=J*\Delta$, $T_D=(J+1)*\Delta$. In this formula, $\Delta$ represents a phase difference between any two adjacent signals of the K signals having uniformly spaced phases, I represents an integer part in the first control word, J represents an integer part in the second control word, $T_A$ represents the first periodic signal, $T_B$ represents the second periodic signal, $T_C$ represents the third periodic signal, and $T_D$ represents the fourth periodic signal.

In an implement of this embodiment of the present disclosure, generating the first frequency signal based on the first periodic signal and the second periodic signal and generating the second frequency signal based on the third periodic signal and the fourth periodic signal include:

generating the first frequency signal and the second frequency signal according to a formula as follows:

$$T_{TAF1}=(1-r)*T_A+r*T_B, T_{TAF2}=(1-s)*T_C+s*T_D.$$

In this formula, $T_{TAF1}$ represents a period of the first frequency signal, r represents a decimal part in the first control word, with $0 \le r < 1$, $T_{TAF2}$ represents a period of the second frequency signal, and s represents a decimal part in the second control word, with $0 \le s < 1$.

In step 403, an optical signal is modulated by the clock signal to obtain a modulated optical signal.

In this embodiment of the present disclosure, the optical signal may be a laser generated by a laser device. The laser had advantages such as good monochromaticity and high brightness, and is particularly suitable for serving as a light source for the optical communication.

Accordingly, modulating the optical signal by the clock signal corresponds to modulating the laser generated by the laser device, so as to obtain a modulated laser signal. For example, the on/off of the laser may be controlled by the high and low levels of the clock signal, thereby generating a laser pulse signal. The laser pulse signal is the modulated laser signal carrying the aforementioned information to be transmitted.

Step 403 may be executed by the modulation circuit in the optical communication drive circuit shown in FIG. 3.

The foregoing descriptions are merely exemplary embodiments of the present disclosure, and are not intended to limit the present disclosure. Within the spirit and principles of the disclosure, any modifications, equivalent substitutions, improvements, or the like are within the protection scope of the present disclosure.

What is claimed is:

1. An optical communication drive circuit, comprising:
   a clock circuit, configured to output a clock signal with an initial frequency signal as an input under control of information to be transmitted, wherein the clock signal comprises alternating first and second frequency signals, the first frequency signal and the second frequency signal having different frequencies and being generated based on the initial frequency signal; and
   a modulation circuit, configured to modulate an optical signal by the clock signal output by the clock circuit to obtain a modulated optical signal; and
   the clock circuit comprises:
      a control sub-circuit, configured to generate a sequence of control words according to the information to be transmitted, wherein the sequence of control words comprises alternating first and second control words; and
      a processing sub-circuit, configured to obtain the first frequency signal based on a frequency of the initial frequency signal and the first control word in the sequence of control words generated by the control sub-circuit, and obtain the second frequency signal based on the frequency of the initial frequency signal and the second control word in the sequence of control words generated by the control sub-circuit; wherein
      the processing sub-circuit comprises:
         a frequency divider, configured to generate K signals having uniformly spaced phases according to the initial frequency signal, wherein K is an integer greater than 2; and
         a frequency synthesizer, configured to generate the first frequency signal based on the K signals having uniformly spaced phases generated by the frequency divider and the first control word, and generate the second frequency signal based on the K signals having uniformly spaced phases and the second control word.

2. The optical communication drive circuit according to claim 1, wherein the control sub-circuit is configured to sequentially select, based on a corresponding relationship between bits and control words, control words corresponding to respective bits in the information to be transmitted according to an order of the bits in the information to be transmitted, so as to obtain the sequence of control words.

3. The optical communication drive circuit according to claim 2, wherein the control sub-circuit is configured to select the corresponding relationship between the bits and the control words according to a communication mode, wherein the corresponding relationship between the bits and the control words is at least partially different in different communication modes.

4. The optical communication drive circuit according to claim 1, wherein the frequency synthesizer is configured to generate a first periodic signal and a second periodic signal based on the K signals having uniformly spaced phases and the first control word, and further generate the first frequency signal based on the first periodic signal and the second periodic signal; and generate a third periodic signal and a fourth periodic signal based on the K signals having uniformly spaced phases and the second control word, and further generate the second frequency signal based on the third periodic signal and the fourth periodic signal.

5. The optical communication drive circuit according to claim 4, wherein the frequency synthesizer is configured to generate the first periodic signal, the second periodic signal, the third periodic signal, and the fourth periodic signal according to a formula as follows:

TA=I*Δ, TB=(I+1)*Δ, TC=J*Δ, TD=(J+1)*Δ, wherein Δ represents a phase difference between any two adjacent signals of the K signals having uniformly spaced phases, I represents an integer part in the first control word, J represents an integer part in the second control word, TA represents the first periodic signal, TB represents the second periodic signal, TC represents the third periodic signal, and TD represents the fourth periodic signal.

6. The optical communication drive circuit according to claim 5, wherein the frequency synthesizer is configured to generate the first frequency signal and the second frequency signal according to a formula as follows:

$$TTAF1=(1-r)*TA+r*TB, TTAF2=(1-s)*TC+s*TD,$$

wherein TTAF1 represents a period of the first frequency signal, r represents a decimal part in the first control word, with $0 \le r < 1$, TTAF2 represents a period of the second frequency signal, and s represents a decimal part in the second control word, with $0 \le s < 1$.

7. An optical communication transmitter, comprising a light emitting unit and an optical communication drive circuit, wherein the optical communication drive circuit comprises:
   a clock circuit, configured to output a clock signal with an initial frequency signal as an input under control of information to be transmitted, wherein the clock signal comprises alternating first and second frequency signals, the first frequency signal and the second frequency signal having different frequencies and being generated based on the initial frequency signal; and a modulation circuit, configured to modulate an optical signal, generated by the light emitting unit, by the clock signal output by the clock circuit to obtain a modulated optical signal; and the clock circuit comprises:
- a control sub-circuit, configured to generate a sequence of control words according to the information to be transmitted, wherein the sequence of control words comprises alternating first and second control words; and
- a processing sub-circuit, configured to obtain the first frequency signal based on a frequency of the initial frequency signal and the first control word in the sequence of control words generated by the control sub-circuit, and obtain the second frequency signal based on the frequency of the initial frequency signal and the second control word in the sequence of control words generated by the control sub-circuit; wherein
the processing sub-circuit comprises:
- a frequency divider, configured to generate K signals having uniformly spaced phases according to the initial frequency signal, wherein K is an integer greater than 2; and
- a frequency synthesizer, configured to generate the first frequency signal based on the K signals having uniformly spaced phases generated by the frequency divider and the first control word, and generate the second frequency signal based on the K signals having uniformly spaced phases and the second control word.

8. An optical communication system, comprising a transmitter and a receiver, wherein the transmitter is the optical communication transmitter as defined in claim 7.

9. A vehicle, comprising the optical communication transmitter as defined in claim 7.

10. An optical communication drive method, comprising:
outputting a clock signal with an initial frequency signal as an input under control of information to be transmitted, wherein the clock signal comprises alternating first and second frequency signals, the first frequency signal and the second frequency signal having different frequencies and being generated based on the initial frequency signal; and
modulating an optical signal by the clock signal to obtain a modulated optical signal;
and outputting the clock signal with the initial frequency signal as the input under the control of the information to be transmitted comprises:
generating a sequence of control words according to the information to be transmitted, wherein the sequence of control words comprises alternating first and second control words; and
obtaining the first frequency signal based on a frequency of the initial frequency signal and the first control word, and obtaining the second frequency signal based on the frequency of the initial frequency signal and the second control word; wherein
obtaining the first frequency signal based on the frequency of the initial frequency signal and the first control word, and obtaining the second frequency signal based on the frequency of the initial frequency signal and the second control word comprise:
generating K signals having uniformly spaced phases according to the initial frequency signal, wherein K is an integer greater than 2; and
generating the first frequency signal based on the K signals having uniformly spaced phases and the first control word, and generating the second frequency signal based on the K signals having uniformly spaced phases and the second control word.

11. The method according to claim 10, wherein generating the sequence of control words according to the information to be transmitted comprises:
sequentially selecting, based on a corresponding relationship between bits and control word, control words corresponding to respective bits in the information to be transmitted according to an order of the bits in the information to be transmitted, so as to obtain the sequence of control words.

12. The method according to claim 11, wherein before sequentially selecting, based on the corresponding relationship between the bits and the control words, the control words corresponding to the respective bits in the information to be transmitted according to the order of the bits in the information to be transmitted, generating the sequence of control words according to the information to be transmitted further comprises:
selecting the corresponding relationship between the bits and the control words according to a communication mode, wherein the corresponding relationship between the bits and the control words is at least partially different in different communication modes.

13. The method according to claim 10, wherein generating the first frequency signal based on the K signals having uniformly spaced phases and the first control word, and generating the second frequency signal based on the K signals having uniformly spaced phases and the second control word comprise:
generating a first periodic signal and a second periodic signal based on the K signals having uniformly spaced phases and the first control word, and further generating the first frequency signal based on the first periodic signal and the second periodic signal; and generating a third periodic signal and a fourth periodic signal based on the K signals having uniformly spaced phases and the second control word, and further generating the second frequency signal based on the third periodic signal and the fourth periodic signal.

14. The method according to claim 13, wherein generating the first periodic signal and the second periodic signal based on the K signals having uniformly spaced phases and the first control word, and generating the third periodic signal and the fourth periodic signal based on the K signals having uniformly spaced phases and the second control word comprise:
generating the first periodic signal, the second periodic signal, the third periodic signal and the fourth periodic signal according to a formula as follows:
$TA=I*\Delta$, $TB=(I+1)*\Delta$, $TC=J*\Delta$, $TD=(J+1)*\Delta$, wherein $\Delta$ represents a phase difference between any two adjacent signals of the K signals having uniformly spaced phases, I represents an integer part in the first control word, J represents an integer part in the second control word, TA represents the first periodic signal, TB represents the second periodic signal, TC represents the third periodic signal, and TD represents the fourth periodic signal.

15. The method according to claim 14, wherein generating the first frequency signal based on the first periodic signal and the second periodic signal, and generating the second frequency signal based on the third periodic signal and the fourth periodic signal comprise:

generating the first frequency signal and the second frequency signal according to a formula as follows:

$$TTAF1=(1-r)*TA+r*TB, TTAF2=(1-s)*TC+s*TD,$$

wherein TTAF1 represents a period of the first frequency signal, r represents a decimal part in the first control word, with $0 \leq r < 1$, TTAF2 represents a period of the second frequency signal, and s represents a decimal part in the second control word, with $0 \leq s < 1$.

16. The method according to claim 11, wherein obtaining the first frequency signal based on the frequency of the initial frequency signal and the first control word, and obtaining the second frequency signal based on the frequency of the initial frequency signal and the second control word comprise:

generating K signals having uniformly spaced phases according to the initial frequency signal, wherein K is an integer greater than 2; and generating the first frequency signal based on the K signals having uniformly spaced phases and the first control word, and generating the second frequency signal based on the K signals having uniformly spaced phases and the second control word.

* * * * *